(12) United States Patent
Luft et al.

(10) Patent No.: US 6,530,604 B1
(45) Date of Patent: Mar. 11, 2003

(54) COUPLING SYSTEM WITH BLOCKING DEVICE

(75) Inventors: Thomas Luft, Au Am Rhein (DE); Robert Stumpf, Munich (DE); Johannes Schmid, Herbertshausen (DE)

(73) Assignee: Aeroquip-Vickers International GmbH, Baden-Baden (DE)

(*) Notice: Subject to any disclaimer, the term of this patent is extended or adjusted under 35 U.S.C. 154(b) by 0 days.

(21) Appl. No.: 09/857,585

(22) PCT Filed: Oct. 30, 1999

(86) PCT No.: PCT/EP99/08293

§ 371 (c)(1),
(2), (4) Date: Aug. 30, 2001

(87) PCT Pub. No.: WO00/36328

PCT Pub. Date: Jun. 22, 2000

(30) Foreign Application Priority Data

Dec. 11, 1998 (DE) .......................... 198 57 144
Jul. 8, 1999 (DE) .......................... 199 31 753

(51) Int. Cl.[7] ............................................... F16L 27/00
(52) U.S. Cl. .......................... 285/190; 285/81; 285/82; 285/93; 285/321; 285/39
(58) Field of Search .......................... 285/39, 190, 81, 285/82, 84, 85, 93, 321, 901

(56) References Cited

U.S. PATENT DOCUMENTS

| 5,226,682 | A |   | 7/1993 | Marrison et al. |
| 5,553,895 | A | * | 9/1996 | Karl et al. ..................... 285/39 |
| 5,570,910 | A |   | 11/1996 | Highlen |
| 6,186,557 | B1 | * | 2/2001 | Funk .......................... 285/39 |

FOREIGN PATENT DOCUMENTS

| AU | 0259316 A | * | 7/1964 | ................. 285/190 |
| DE | 296 80 971 U1 |   | 10/1996 | |
| EP | 0 757 201 B1 |   | 11/1998 | |

* cited by examiner

Primary Examiner—Lynne H. Browne
Assistant Examiner—Aaron M Dunwoody
(74) Attorney, Agent, or Firm—Emch, Schaffer, Schaub & Porcello, Co., L.P.A.

(57) ABSTRACT

A coupling arrangement connects two elements with each other. The coupling arrangement includes a plug element and a bushing element which are configured in such a manner that they can be plugged together and locked in position by means of an expandable retaining ring. An axially movable release arrangement cooperates with the retaining ring in order to release the locking mechanism. The coupling arrangement is characterized in that the release arrangement (41) comprises a release sleeve (43), which can be closed with a cover (51) on its side facing away from the bushing element (5), and that a blocking device (55) is used to prevent an inadvertent release of the coupling.

12 Claims, 5 Drawing Sheets

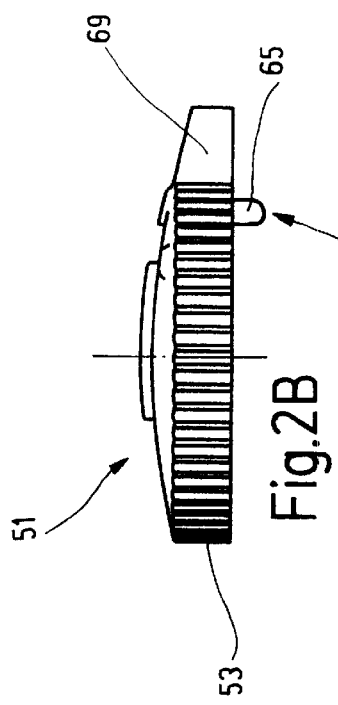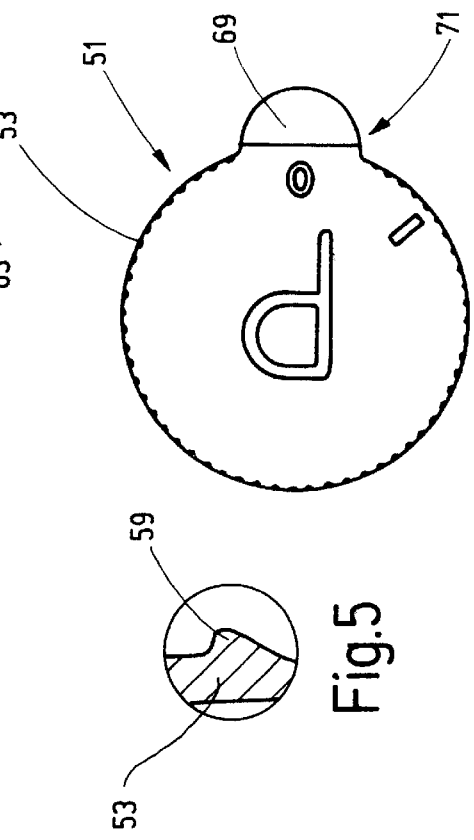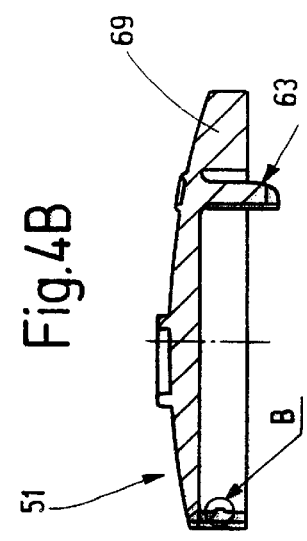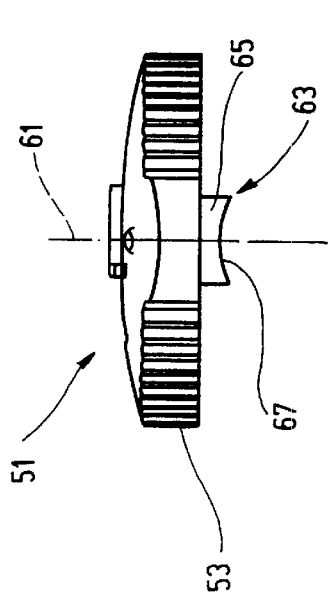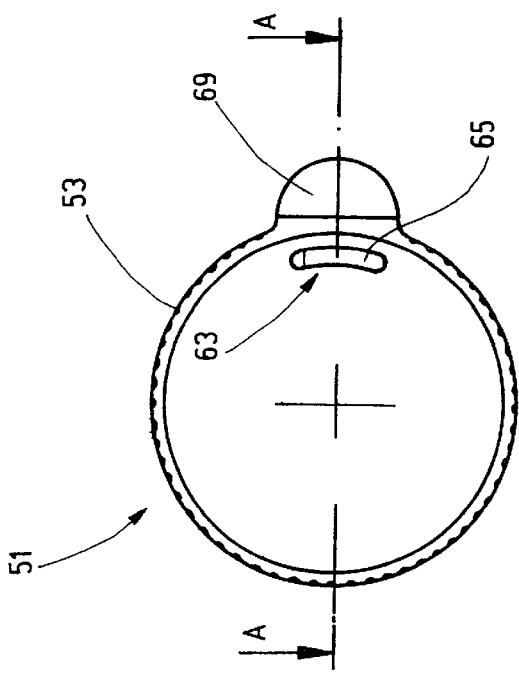

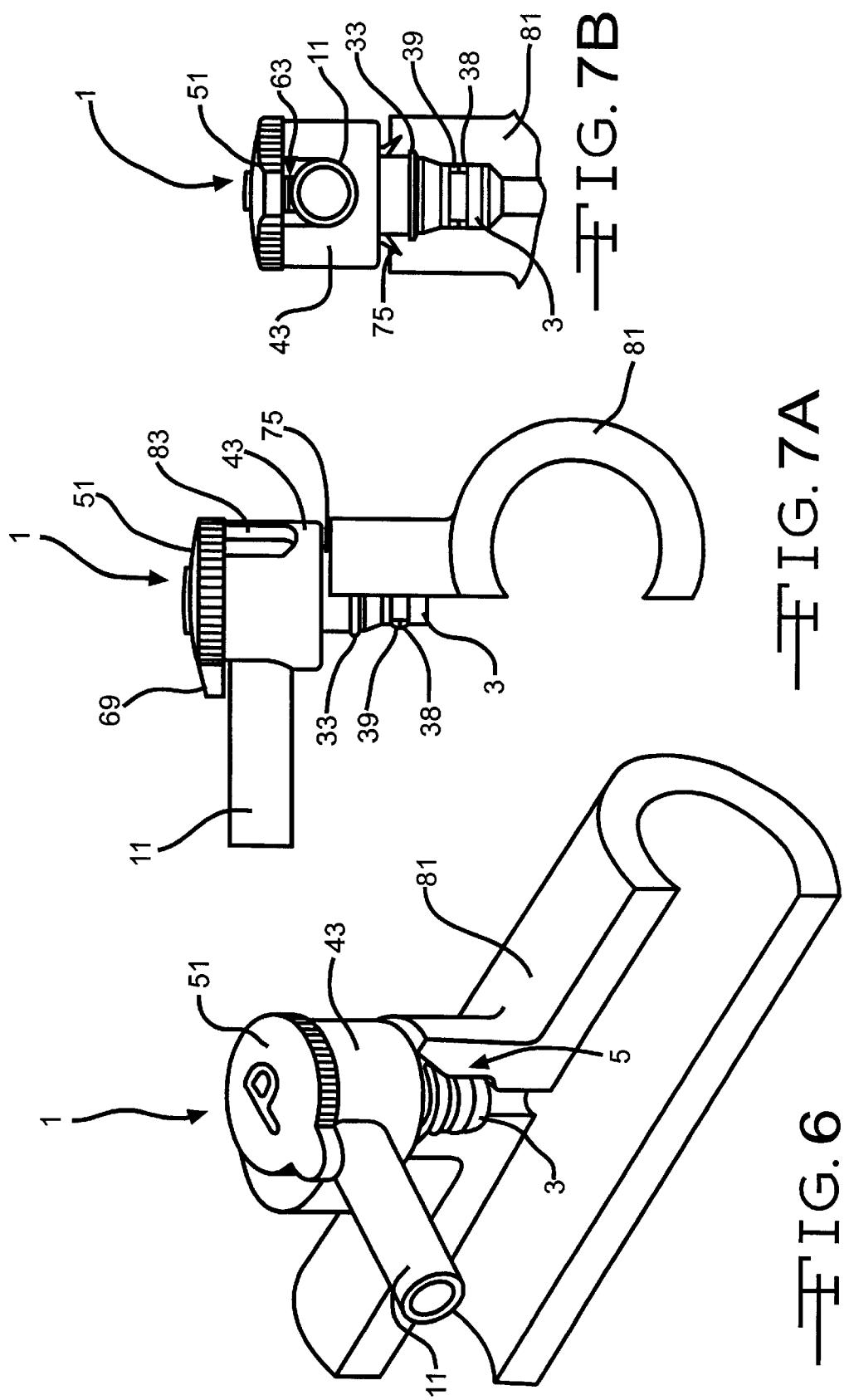

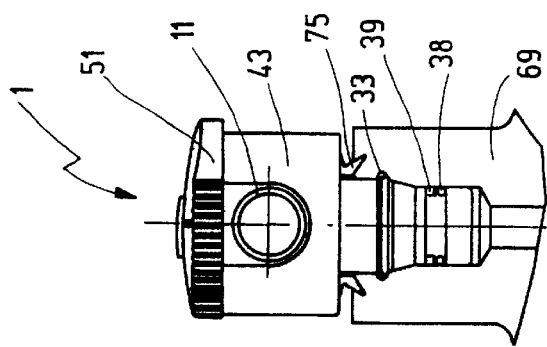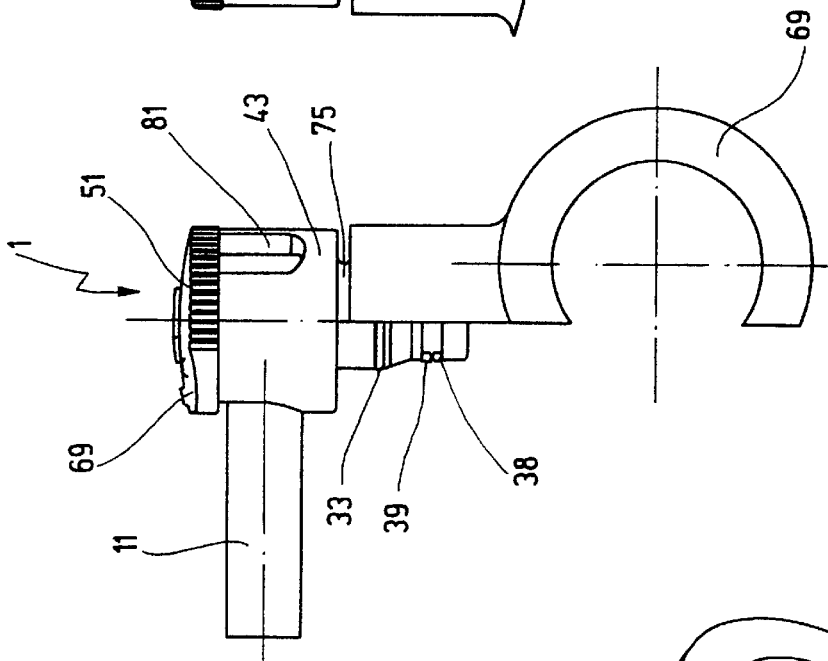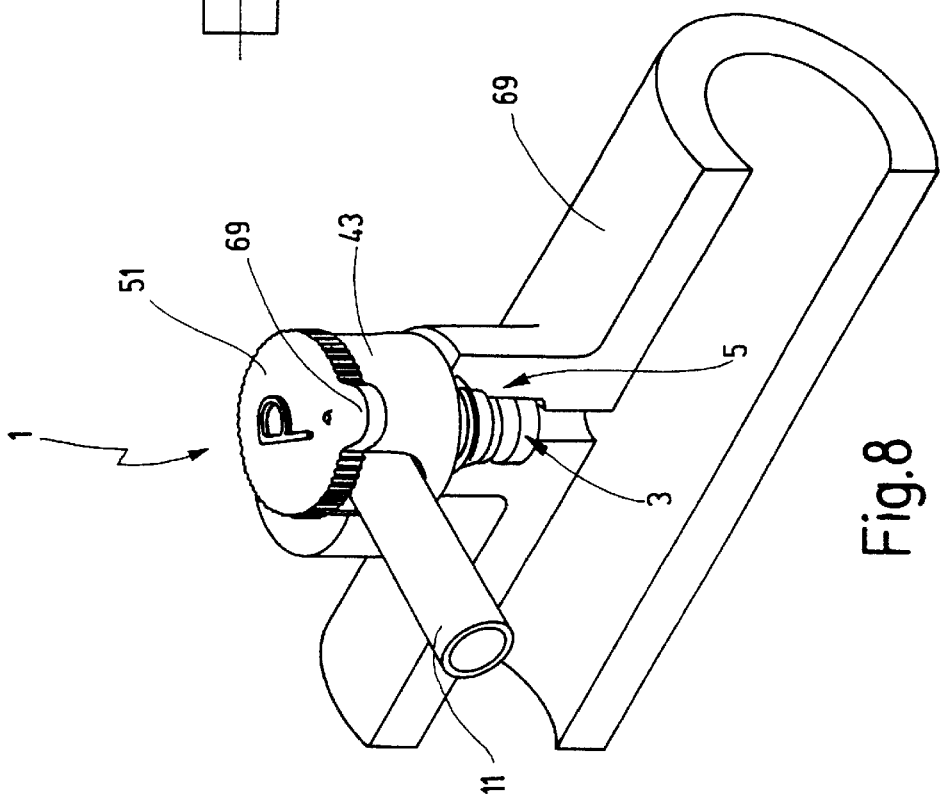

COUPLING SYSTEM WITH BLOCKING DEVICE

CROSS REFERENCE TO RELATED APPLICATIONS

The present patent application is based upon and claims priority from German Patent Application No. 19857144.5 filed Dec. 11, 1998, German Patent Application No. 19931753.4 filed Jul. 8, 1999 and International Patent Application PCT/EP99/08293 filed Oct. 30,1999.

BACKGROUND OF THE INVENTION

The invention herein relates to a coupling arrangement for connecting two elements, said arrangement comprising a plug element and a bushing element which can be connected with each other and locked together by means of an expandable retaining ring.

Coupling arrangements of the type addressed herein have been known (U.S. Pat. No. 5,553,895 A). It has been found that sometimes special tools are required to unlock such coupling arrangements and that the user must apply relatively great force to perform the uncoupling procedure, which, in addition, requires that the user possess certain skills.

Therefore, the problem to be solved by the invention herein is to provide a coupling arrangement which features a simple design and, in addition, can be taken apart easily without the use of tools.

SUMMARY OF THE INVENTION

Under the present invention, a coupling arrangement is provided having a release arrangement with a blocking device. This coupling arrangement is characterized in that the release arrangement comprises a release sleeve, which, on its side facing away from the bushing element, can be closed with a cover and that the inadvertent release of the coupling can be prevented with the use of a blocking device. In combination with the release sleeve, the cover acts as a release tool being an integral part of the coupling arrangement, whereby said tool can be moved advantageously by applying pressure (e.g., the user's thumb) to said cover. The force required by the user to release the locking mechanism is only very small, whereby, due to the relatively large surface area are of the cover—which preferably has a closed cover bottom—available for the application of pressure, great ease of use is ensured while pressure is being applied. The blocking device ensures that eh coupling cannot be released inadvertently, for example, due to the impact of a stone.

Particularly preferred is an example of embodiment of the coupling arrangement, in which case the cover is part of the blocking device and can be moved into a locked position and in into actuation position. The locked position does not allow the non-destructive release of the coupling. To achieve this, the cover must first be moved into the actuation position, preferably by pivoting motion, so that the locking mechanism may be released. Therefore, the cover performs a dual function: on one hand it is used, together with the release sleeve, as a release tool for releasing the locking mechanism and on the other hand as a securing element offering protection against the inadvertent release of the locking mechanism.

In one advantageous example of embodiment of the coupling arrangement the cover is retained on the release sleeve with the use of a snap connection that is preferably "not releasable." In this context "not releasable" is understood to mean that, upon affixing the cover to the release sleeve, said cover can no longer be removed without damaging it or another part of the coupling arrangement. By configuring the snap or engagement connection in such a manner that the cover is protected against loss, a quasi one-piece component is created after the initial connection of the cover with the sleeve. Consequently, the cover can be mounted in a simple manner and preferably without any tools, for example, by pressing or snapping it on the release sleeve.

Additional advantageous forms of embodiment of the coupling arrangement are disclosed by the remaining subclaims.

BRIEF DESCRIPTION OF THE DRAWINGS

FIGS. 2A and 2B side elevations of an example of embodiment of the cover;

FIG. 3 a cross-section of the cover in accordance with FIG. 2A and 2B;

FIGS. 4A and 4B a view of the underside and a view of the top of the cover shown in FIG. 2A and 2B;

FIG. 5 a sectional view, greatly enlarged, of a part of the cover marked "B" in FIG. 3;

FIG. 6 a perspective illustration of an example of embodiment in coupled state, whereby the cover is in locked position;

FIGS. 7A and 7B side elevations of the coupling arrangement shown in FIG. 6;

FIG. 8 a perspective illustration of the coupling arrangement shown in FIG. 6, whereby the cover is in actuation position; and FIGS. 9A and 9B side elevations of the coupling arrangement shown in FIG. 8.

FIG. 1 shows a cross-section of an example of embodiment of a coupling arrangement 1, a plug element 3 and a bushing element 5. In the case of this example of embodiment the bushing element is configured in a rotation-symmetrical manner. Plug element 3 has a pocket bore 7 extending parallel to central longitudinal axis 9 of plug element 3. In order to connect plug element 3 to a pipe 11, the base area of pocket bore 7 is provided with a transverse bore 13 terminating in said pocket bore, said pocket bore accommodating the end of pipe 11. Of course, instead of pipe 11, a hose or the like may be connected with plug element 3 in a suitable manner. Pipe 11 connected with plug element 3 is aligned with respect to plug element 3 in such a manner that central longitudinal axis 15 of pipe 11 extends in orthogonal direction with respect to central longitudinal axis 9 of plug element 3.

Figure 1:
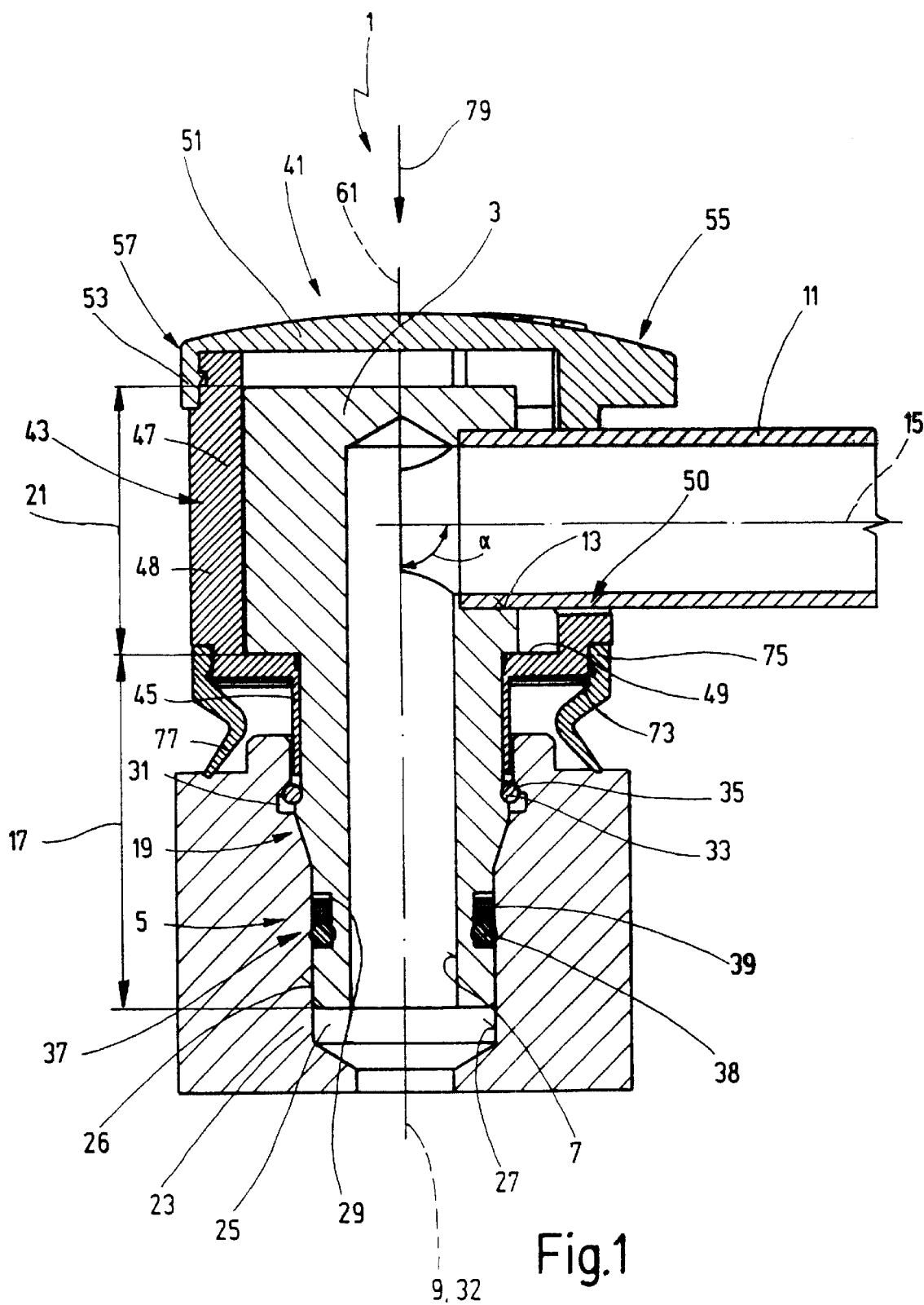
FIG. 1 a cross-section of a first example of embodiment of the coupling arrangement.

Plug element 3 comprises a first rotation-symmetrical longitudinal section 17 with a larger-diameter portion created here by a peripheral bead 19. Furthermore, plug element 3 has a second rotation-symmetrical longitudinal section 21, the function of which will be described later in detail.

Bushing element 5, which, in the example of embodiment herein has a tubular configuration, may itself be connected with a pipe, a hose or the like. Of course, it is also possible to integrate bushing element 5 in a connection box for direct connection of the plug element with any other module, for example a pump, a container or the like. One wall 23 of bushing element 5 encloses an interior space 25 having circular cross-section, said space being designed for the accommodation of longitudinal section 17 of plug element 3. With the use of plug element 3 and bushing element 5, a tight seal is to be established between the pipes, hoses or modules connected to the two elements.

Exterior side 26 of plug element 3 has a peripheral groove 29 in the region of the first longitudinal element 17, whereby—viewed in longitudinal direction of plug element 3—said groove 29 is located at a distance from a peripheral groove 31 on interior wall 27 of bushing element 5. The distances of grooves 29, 31 from axis of rotation 32 of bushing element 5 are different. As is obvious from FIG. 1, axis of rotation 32 of bushing element 5 and central longitudinal axis 9 of plug element 3 coincide at this point.

In the region of upper groove 31 a retaining ring 33 is provided, whereby said ring abuts against a surface of groove 31 extending in a direction diagonal to axis of rotation 32. Retaining ring 33 is configured in such a manner that its diameter can be expanded. Preferably, a retaining ring 33, which can be split at a point, a so-called spring ring, is used. The diameter of retaining ring 33 is selected slightly greater than the inside diameter of interior space 25. In order to seal the connection between plug element 3 and bushing element 5, a sealing means 37 is provided, said sealing means consists of an O-ring 38 and a bearing ring 39 located in groove 29 of plug element 3 in this example of embodiment. Bearing ring 39 is used to support O-ring 38, when pressure is applied. Sealing means 37 seals the gap between bushing element 5 and plug element 3.

Furthermore, coupling arrangement 1 comprises a release arrangement 41 with a release sleeve 43. Release sleeve 43 has a tubular first longitudinal section 45 and a cup-shaped second longitudinal section 47 that are connected with each other to form one piece. The outside diameter in the region of the second longitudinal section 47 is greater than that in the region of the first longitudinal section 45, thereby forming a peripheral collar. Plug element 3 is inserted in release sleeve 43 in such a manner that its first longitudinal section 17 having the smaller diameter is supported, essentially without play and movable in longitudinal direction, in the region of the first longitudinal section 45 of release sleeve 43. This is accomplished in that the inside diameter of the first longitudinal section 45 of release sleeve 43 has essentially the same size as the outside diameter of the first longitudinal section 17 of plug element 3.

The second longitudinal section 21 of plug element 3 is located inside release sleeve 43, i.e., it is completely enclosed by jacket 48 of release sleeve 43, and abuts against bottom 49 of the cup-shaped second longitudinal section 47 of release sleeve 43, while the first longitudinal section 17 of plug element 3 is inserted through an opening provided in bottom 49. The height of the second longitudinal section 21 of plug element 3 is smaller than that of the second longitudinal section 47 of release sleeve 43, so that this part of plug element 3 is enclosed completely by the wall of release sleeve 43.

As is obvious from FIG. 1, longitudinal section 47 of release sleeve 43 has an opening 50 into which pipe 11 is inserted. In this example of embodiment, central longitudinal axis 15 of pipe 11 is inclined with respect to axis of rotation 32, or with respect to central longitudinal axis 9 of plug element 3, by an angle $\alpha=90°$. Angle $\alpha$, which is within a range of $0° \leq \alpha \leq 180°$, is variable. Furthermore, coupling arrangement 1 is characterized in that the parts to be connected (module, pump, container or the like) need not to be in alignment.

On its side facing away from plug element 5, release sleeve 43 is closed with a cover 51 having a peripheral collar 53 extending over a circular region of longitudinal section 47 of release sleeve 43. Cover 51 is part of a blocking device 55, which will be discussed in detail hereinafter. A snap connection 57, preferably non-releasable, is used for connecting cover 51 with release sleeve 43; this means, once cover 51 has been mounted, it can no longer be removed from release sleeve 43 in a non-destructive manner. Consequently, the loss of the cover can be prevented with certainty. In this example of embodiment, snap closure 57 is created by a peripheral groove provided on the outside of jacket 48 of the second longitudinal section 47 of release sleeve 43 and a projection 59 (FIG. 5) on the inside of collar 53 of cover 51. Projection 59 comes into engagement with the groove on jacket 48 in such a manner that a removal of cover 51 from release sleeve 43 is not possible. Projection 59 and the groove are adapted to each other in such a manner that, with projection 59 engaged, cover 51 can still be pivoted about its central axis 61 in clockwise as well as counterclockwise direction. By pivoting, cover 51 can be moved into a locked position, in which the locking mechanism cannot be released, and into an actuation position, in which the locking mechanism can be released.

Each of FIG. 2A and 2B shows a side elevation of cover 51, which, in this example of embodiment, has a wavy surface created by vertically extending recesses on the outside of collar 53—viewed in peripheral direction of collar 53—said surface making it easier to grip cover 51 more firmly. The inside of cover 51 has a stop element 63 which is connected with cover 51 so as to form one piece with said cover. Stop element 63 consists of a wall 65, which extends over a small peripheral area of cover 51 having an essentially circular form when viewed from the top. Preferably, said wall consists of a material exhibiting certain elasticity. In locked position of cover 51 (FIG. 6), wall 65 abuts against the external contour of a counter-element or it is arranged at a distance from such a counter-element. Abutment surface 67 of wall 65 preferably is adapted to the external contour of the counter-element. In the case of the example of embodiment explained with reference to FIG. 1, said counter-element is configured as the pipe 11. Therefore, abutment surface 67 of stop element 63 has a curved, preferably arcuate, shape.

As is obvious from FIG. 4A and 4B, which show bottom and top views of cover 51, cover 51 has an essentially circular form in the region of its second longitudinal section 47 to correspond with the cross-sectional form of the release sleeve in the region of its second longitudinal section 47. The upper side of the cover (FIG. 4B) is stamped with a large "P" to indicate to the user that a pressure-type connection exists at this point. Furthermore, cover 51 has a projection 69, which extends from the external peripheral surface of cover 51, i.e., collar 53, and, in this example of embodiment is configured as a nose when cover 51 is viewed from.the top. In conjunction with a stationary point or part, for example, pipe 11, projection 69 is used as an indicating means 71 for a user. With cover 51 is mounted, a first position of projection 69 relative to said pipe corresponds to the locked position and a second relative position corresponds to the actuation position.

Numbers "0" and "I" provided on the upper side of cover 51 are arranged in peripheral direction of said cover at an angular distance of approximately 45°. Number "0" is located at the height of projection 69 and number "I" is offset in peripheral direction with respect to the latter.

FIG. 3 depicts a cross-section of cover 51 along line A—A of FIG. 4 and shows that stop element 63 being an integral part of the cover's bottom is located on the same height as projection 69 and radially offset toward the inside, when viewed in peripheral direction of cover 51.

Figure 4C:
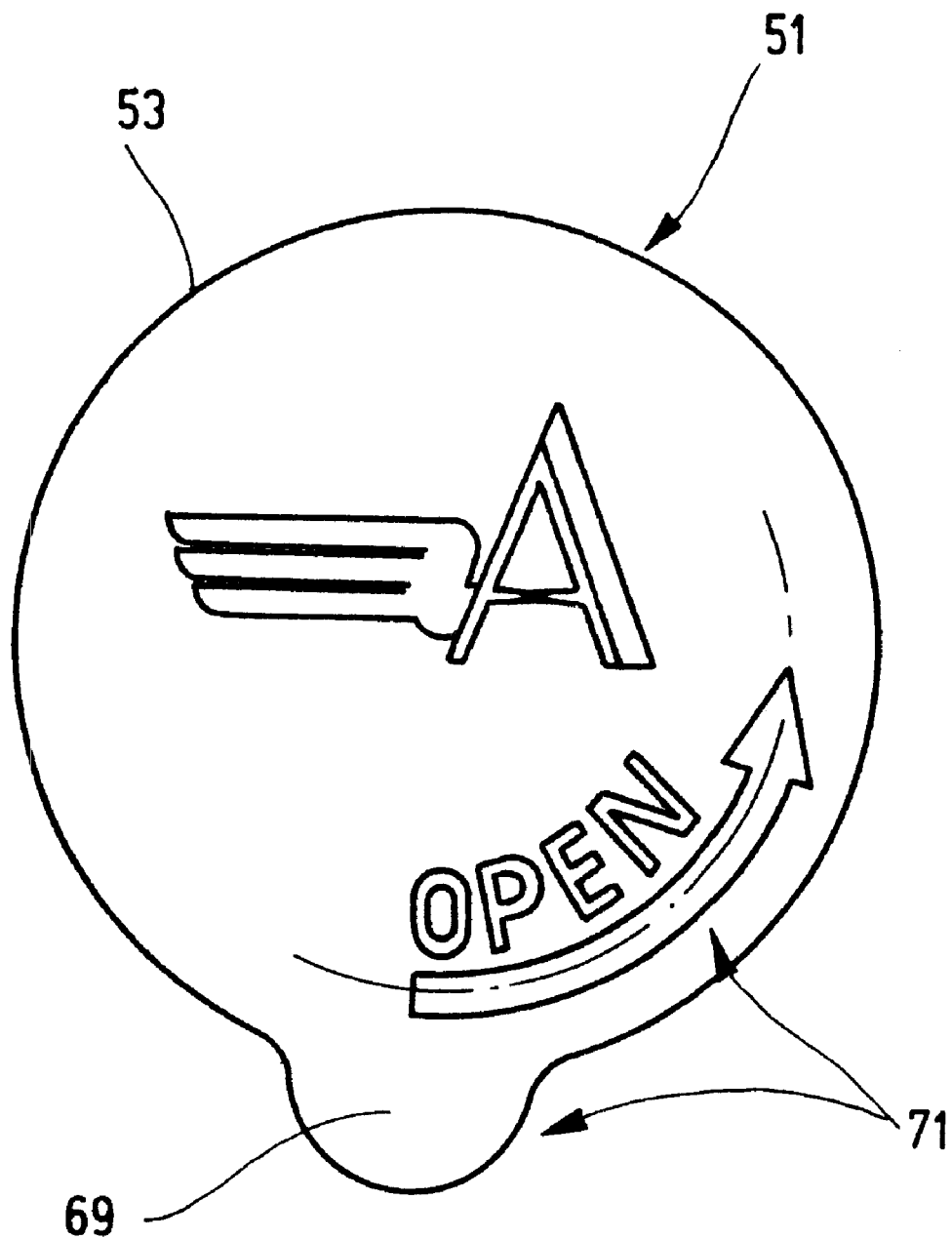
FIG. 4C a plan view of another form of embodiment of the cover.

FIG. 4C shows a plan view of another example of embodiment of cover 51, which differs from the cover shown in FIG. 4B only in that it has a company logo applied to the cover's upper side instead of a large "P." Furthermore, indicating means 71 in this example of embodiment, consists of projection 69 as well as the phrase "OPEN" and an arrow indicating the cover's direction of rotation.

As shown by FIG. 1, a sealing element 75 is provided on the end side 73 of release sleeve 43 facing bushing element 5, said sealing element acting as protection against dirt and being configured as a circular axial sealing lip 77 coming into engagement with an open-edge recess on the outside of the second longitudinal section 47 of release sleeve 43. Sealing element 75 prevents the penetration of dirt into the space between release sleeve 43 and bushing element 5, or the component—e.g., a module—comprising bushing element 5. As an alternative, bushing element 75 described with reference to FIG. 1 may be placed on end side 73 of release sleeve 43 facing bushing element 5, or on the outside or inside of release sleeve 43.

Each of FIG. 6 and FIG. 8 shows a perspective illustration of coupling arrangement 1, whereby cover 51 is depicted in locked position in FIG. 6 and in actuation position in FIG. 8. Each of FIG. 7A and FIG. 7B shows—in association with FIG. 6—a side elevation, partially in section, of coupling arrangement 1; and each of FIG. 9A and 9B shows a side elevation, partially in section, of coupling arrangement 1 as shown by FIG. 8. The same parts have the same reference numbers; therefore, reference is made to the description of the previously used figures.

In this case, bushing element 5 is connected with a module 81 (shown in longitudinal section) in order to form one piece, i.e., in order to be an integral part of said module. FIGS. 6, 7A and 7B, respectively, show cover 51 pivoted into its first position, the locked position, in which.projection 69 on cover 51 is located above pipe 11. Stop element 63 of blocking arrangement 55 is also located above pipe 11 and its wall 65 is supported by the external contour of pipe 11 (FIG. 7B). Consequently, abutment surface 67 of stop element 63 abuts against the outside of pipe 11. In another example of embodiment not depicted by the drawings, stop element 63 is in locked position of cover 51 at a—preferably small—distance from pipe 11. When pressure (arrow 79) is applied to the cover's upper side, stop element 63 cooperating with pipe 11 prevents a shifting of release sleeve 43 in the direction of retaining ring 33 in such a manner that the release of the locking mechanism is prevented.

In FIG. 8, cover 51 is pivoted, with respect to its position shown in FIG. 6, in counterclockwise manner about its central axis 61 by a quarter turn into the actuation position, in which projection 69 of cover 51—when cover 51 is viewed from the top—is located on the side of pipe 11. When release sleeve 43 is pressed in downward direction following arrow 79 (FIG. 1), stop element 63 does not abut against pipe 11, but passes through it in lateral direction. As a result of this, release sleeve 43 can be pushed downward in vertical direction until the locking mechanism releases.

Hereinafter, the function of release arrangement 41 and blocking device 55 of coupling arrangement 1 are described in greater detail:

FIG. 1 shows coupling arrangement 1 in coupled state. This means that plug element 3 has been plugged into bushing element 5. The free end of longitudinal section 45 of release sleeve 43 is located directly on retaining ring 33 and, when pressure is applied to cover 51 in axial direction, comes into contact with retaining ring 33 in order to transmit the axial force to retaining ring 33. The outside diameter of longitudinal section 45 of release sleeve 43 is selected in such a manner that said section can be moved and guided—with slight radial play—in axial direction through the inside wall 27 of bushing element 5. When plug element 3 is plugged into bushing element 5, sealing lip 77 rests against the end side of bushing element 5 facing release sleeve 43 so as to form a seal. Sealing lip 77 consists of an elastic material so that release sleeve 43 may be pressed in axial direction onto bushing element 5. At the same time, due to its elasticity, sealing lip 77 ensures that release sleeve 43 and hence plug element 3 are subjected to a force acting against the direction of insertion, whereby retaining ring 33 is clamped between the portion having the greater diameter (bead 19) of the first longitudinal section 17 and area 35 of internal wall 27. Consequently, coupling arrangement 1 is locked in position.

In order to release the locking mechanism, cover 51 shown in a locked position in FIG. 6 is pivoted in a counterclockwise manner about its central axis into the actuation position shown in FIG. 8. With cover 51 in actuation position, stop element 63—viewed in axial direction of plug element 3—is offset with respect to pipe 11 so that, if pressure is applied to cover 51 in the direction of bushing element 5 (arrow 79), release sleeve 43 is moved in axial direction and pressed against retaining ring 33. In so doing, retaining 33 is forced into groove 31 in bushing element 5, whereby the coupling's locking mechanism is released and plug element 3 can be pulled out of bushing element 5.

Release sleeve 43 is preferably produced by injection-molding and may consist of metal and/or plastic material. Release sleeve 43 shown in the drawings has in its jacket surface at least one opening 83 (FIG. 7A and FIG. 9A) which improves the handling ability of release sleeve 43 and permits removal of heavy dirt, for example, and, which the use of a pressurized steam cleaner. Of course, in another form of embodiment of said release sleeve its jacket surface may be closed, i.e., not be provided with an opening.

A particular advantage of the example of embodiment described with reference to the drawings, in addition to the simple release of the locking mechanism of the coupling arrangement by pressing release sleeve 43 in downward direction, is that sealing element 75 as well as sealing means 37 remain in release sleeve 43 or on plug element 3. Consequently, the design of bushing element 5 can be simplified. Moreover, it is possible to exchange sealing element 75 and/or sealing means 37 during each coupling operation.

All examples of embodiment of coupling arrangement 1 have in common that they are constructed in a simple and cost-effective manner and, in addition, can be released easily, require the application of preferably little force and feature great ease of use. Due to blocking device 55, the unintentional release of the locking mechanism can be eliminated. Blocking device 55 may be designed in any manner; for example, the counter-element cooperating with stop element 63 may be an integral part of the component comprising the bushing element. Important is that the blocking device permits a simple move of cover 51 into the locked or actuation position and is preferably easy to manufacture.

Of course, the blocking device may also be configured in such a manner that it cooperates directly with release sleeve 43, whereby, in this case, its cover is used as a cover for said release sleeve's end facing away from the bushing element and as an actuation element for the release of the locking mechanism.

In an example of embodiment of coupling arrangement 1 not shown by the drawings, a seal, in particular a flat seal, is interposed between the second longitudinal section 21 of plug element 3 and bottom 49 of release sleeve 43 in order to prevent the penetration of dirt in the gap between said plug element and said release sleeve. At the same time, this flat seal acts as abutment surface for the plug element.

Furthermore, coupling arrangement 1 may be associated with at least one indicating element, which indicates the connection of both coupling elements (bushing element/plug element).

What is claimed is:

1. Coupling arrangement for connecting two elements with each other, said arrangement comprising a plug element and a bushing element, which are configured in such a manner that they can be plugged together and locked in position by means of an expandable retaining ring, and comprising an axially movable release arrangement, which cooperates with the retaining ring in order to release the locking mechanism, characterized in that the release arrangement (41) comprises a release sleeve (43), which can be closed, on its side facing away from the bushing element (5), by a cover, and that a blocking device (55) is used to prevent the inadvertent release of said coupling.

2. Coupling arrangement in accordance with claim 1, characterized in that the cover (51) is part of the blocking device (55) and can be moved into a locked position, in which a release of the coupling is prevented, and an actuation position, in which a release of the coupling is possible.

3. Coupling arrangement in according with claim 1, wherein said cover has a central axis and characterized in that the cover (51) can be pivoted about said central axis.

4. Coupling arrangement in accordance with claim 1, characterized in that the cover (51) has a peripheral collar (55) which extends over part of the release sleeve (43).

5. Coupling arrangement in accordance with claim 1, characterized in that the cover (51) is held in position on the release sleeve (43) by means of a snap connection (57).

6. Coupling arrangement in accordance with claim 1, characterized in that, on the inside of the cover (51), a stop element (63) is provided, which, in locked position, cooperates with a pipe (11) extending from said plug element (3).

7. Coupling arrangement in accordance with claim 6, characterized in that the stop element (63) comprises a wall (65) extending over a small peripheral area of the cover (51).

8. Coupling arrangement in accordance with claim 7, characterized in that the wall (65) has an abutment surface (67) adapted to engage the external contour of said pipe (11).

9. Coupling arrangement in accordance with claim 1, characterized in that the cover (51) has an essentially circular external contour.

10. Coupling arrangement in accordance with claim 1, wherein said cover may be moved between functional locked and actuation positions and characterized by an indicating means (71) for indicating at least one of the functional locked or actuation positions of the cover (51).

11. Coupling arrangement in accordance with claim 10, wherein said cover has a central axis and a peripheral surface encircling said axis and characterized in that the indicating means (71) comprises a nose-shaped projection (69) extending from the peripheral surface of the cover (51).

12. Coupling arrangement in accordance with claim 10, characterized in that the indicating means (71) is a stamping or a colored mark.

* * * * *